United States Patent

Kohinata

(10) Patent No.: US 11,578,208 B2
(45) Date of Patent: Feb. 14, 2023

(54) AROMATIC POLYSULFONE RESIN AND MEMBRANE THEREOF

(71) Applicant: SUMITOMO CHEMICAL COMPANY, LIMITED, Tokyo (JP)

(72) Inventor: Yusaku Kohinata, Tokyo (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 113 days.

(21) Appl. No.: 16/961,576

(22) PCT Filed: Nov. 29, 2018

(86) PCT No.: PCT/JP2018/044011
§ 371 (c)(1),
(2) Date: Jul. 10, 2020

(87) PCT Pub. No.: WO2019/142507
PCT Pub. Date: Jul. 25, 2019

(65) Prior Publication Data
US 2021/0061997 A1    Mar. 4, 2021

(30) Foreign Application Priority Data
Jan. 18, 2018  (JP) .............................. JP2018-006604

(51) Int. Cl.
*C08L 81/06* (2006.01)
*B01D 71/68* (2006.01)

(52) U.S. Cl.
CPC .............. *C08L 81/06* (2013.01); *B01D 71/68* (2013.01); *B01D 2325/02* (2013.01)

(58) Field of Classification Search
CPC ..... B01D 71/68; B01D 2325/02; C08L 81/06; C08J 2381/06; C08J 5/18; C08G 75/205; C08G 75/23; C08G 65/40; G01N 2030/486
See application file for complete search history.

(56) References Cited

U.S. PATENT DOCUMENTS

| 4,237,259 A | 12/1980 | Keeley |
| 2011/0172317 A1* | 7/2011 | Lehmann ............... B01D 71/68 |
| | | 210/500.21 |
| 2012/0190764 A1 | 7/2012 | Kohinata et al. |

FOREIGN PATENT DOCUMENTS

| CN | 102482412 A | 5/2012 |
| CN | 105504263 A | 4/2016 |
| CN | 105504263 B | 7/2018 |
| EP | 1 693 076 A1 | 8/2006 |
| JP | 55-098229 A | 7/1980 |
| JP | 2006-077043 A | 3/2006 |
| JP | 2006-230459 A | 9/2006 |
| JP | 2008-094921 A | 4/2008 |
| WO | 2008/012222 A2 | 1/2008 |
| WO | 2017/114163 A1 | 7/2017 |

OTHER PUBLICATIONS

International Search Report issued in corresponding International Patent Application No. PCT/JP2018/044011, dated Jan. 8, 2019, with Engish translation.
Extended European Search Report issued in corresponding European Patent Application No. 18900642.2-1102, dated Sep. 20, 2021.

* cited by examiner

*Primary Examiner* — Shane Fang
(74) *Attorney, Agent, or Firm* — McDermott Will & Emery LLP

(57) ABSTRACT

An aromatic polysulfone resin having a repeating unit represented by Formula (I) and a repeating unit represented by Formula (II), in which a ratio (m:n) of a molar content (m) of the repeating unit represented by Formula (I) to a molar content (n) of the repeating unit represented by Formula (II) is 1:2,000 to 1:200.

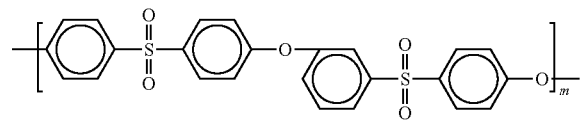

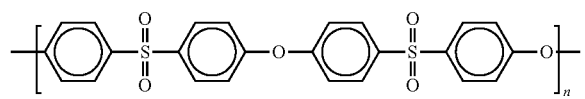

wherein hydrogen atoms of phenylene groups of Formulae (I) and (II) may be each independently substituted with an alkyl group, an aryl group, or a halogen atom.

5 Claims, No Drawings

AROMATIC POLYSULFONE RESIN AND MEMBRANE THEREOF

CROSS REFERENCE TO RELATED APPLICATIONS

This application is the U.S. National Phase under 35 U.S.C. § 371 of International Application No. PCT/JP2018/044011, filed on Nov. 29, 2018, which claims the benefit of Japanese Application No. 2018-006604, filed on Jan. 18, 2018, the entire contents of each are hereby incorporated by reference.

TECHNICAL FIELD

The present invention relates to an aromatic polysulfone resin and a membrane thereof.

Priority is claimed on Japanese Patent Application No. 2018-006604, filed Jan. 18, 2018, the content of which is incorporated herein by reference.

BACKGROUND ART

Aromatic polysulfone resins are used in various applications due to their good heat resistance and chemical resistance. As one of the applications, a material for a porous membrane for use in filtration such as ultrafiltration or precision filtration is mentioned. For example, Patent Document 1 describes that an aromatic polysulfone resin is used as a material for a porous hollow fiber membrane.

CITATION LIST

Patent Documents

[Patent Document 1] JP2006-230459A

SUMMARY OF THE INVENTION

Problems to be Solved by the Invention

In a case where a hollow fiber membrane using such a resin is used as an artificial dialysis membrane, the hollow fiber membrane may be sterilized. Examples of the sterilization treatment include a heat treatment, a radiation treatment, and a steam sterilization treatment. The steam sterilization treatment as an example of the sterilization treatment is performed under high temperature and high pressure conditions of a temperature of 121° C. and a pressure of 0.2 MPa. In this case, in a case where the hollow fiber membrane has a high heat shrinkage rate, cracks may occur in the hollow fiber membrane due to the heat shrinkage of the hollow fiber membrane.

Even in a case where the hollow fiber membrane is not sterilized, it is thought that the same problem occurs also in a case where the membrane is heated during the manufacturing or use of the hollow fiber membrane.

In addition, the occurrence of cracks caused by the heat shrinkage of the hollow fiber membrane is a problem that may occur in flat membranes and tubular membranes. In addition, the above-described problem is common to both single-layer membranes and multi-layer membranes.

The present invention has been contrived in view of such circumstances, and an object of the present invention is to provide an aromatic polysulfone resin which is used to obtain a membrane having a low heat shrinkage rate and a membrane thereof.

Means to Solve the Problems

In order to solve the above-described problem, the present invention includes the following aspects.

[1] An aromatic polysulfone resin having a repeating unit represented by Formula (I) and a repeating unit represented by Formula (II), in which a ratio (m:n) of a molar content (m) of the repeating unit represented by Formula (I) to a molar content (n) of the repeating unit represented by Formula (II) is 1:2,000 to 1:200.

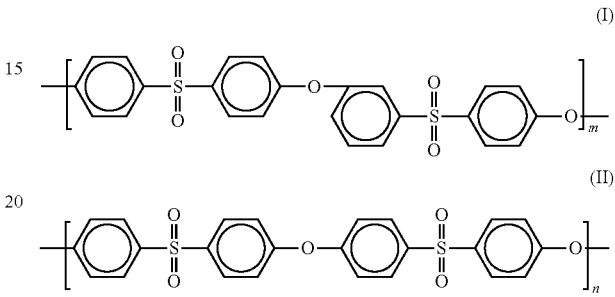

(Hydrogen atoms of phenylene groups of Formulae (I) and (II) may be each independently substituted with an alkyl group, an aryl group, or a halogen atom.)

[2] A membrane containing the aromatic polysulfone resin according to [1].

[3] The membrane according to [2], which is a porous membrane.

Effects of the Invention

According to one aspect of the present invention, provided are an aromatic polysulfone resin which is used to obtain a membrane having a low heat shrinkage rate and a membrane thereof.

EMBODIMENTS FOR CARRYING OUT THE INVENTION

[Aromatic Polysulfone Resin]

Typically, an aromatic polysulfone resin is a resin having a repeating unit including a divalent aromatic group (that is, a residue obtained by removing, from an aromatic compound, two hydrogen atoms bonded to an aromatic ring of the aromatic compound), a sulfonyl group (—$SO_2$—), and an oxygen atom. From the viewpoint of heat resistance and chemical resistance, the aromatic polysulfone resin preferably has a repeating unit represented by Formula (1) (hereinafter, may be referred to as "repeating unit (1)"), and may further have at least one of other repeating units such as a repeating unit represented by Formula (2) (hereinafter, may be referred to as "repeating unit (2)") and a repeating unit represented by Formula (3) (hereinafter, may be referred to as "repeating unit (3)").

$Ph^1$ and $Ph^2$ each independently represent a phenylene group. Hydrogen atoms of the phenylene group may be each independently substituted with an alkyl group, an aryl group, or a halogen atom.

$Ph^3$ and $Ph^4$ each independently represent a phenylene group. Hydrogen atoms of the phenylene group may be each independently substituted with an alkyl group, an aryl group, or a halogen atom. R represents an alkylidene group, an oxygen atom, or a sulfur atom.

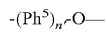   (3)

Ph⁵ represents a phenylene group. Hydrogen atoms of the phenylene group may be each independently substituted with an alkyl group, an aryl group, or a halogen atom. n' represents an integer of 1 to 3. In a case where n' is 2 or more, a plurality of $Ph^5$'s may be the same or different from each other.

The phenylene group represented by any of $Ph^1$ to $Ph^5$ may be a p-phenylene group, an m-phenylene group, or an o-phenylene group, and is preferably a p-phenylene group.

The alkyl group which may substitute a hydrogen atom of the phenylene group is preferably an alkyl group having 1 to 10 carbon atoms, and examples thereof include a methyl group, an ethyl group, an n-propyl group, an isopropyl group, an n-butyl group, an isobutyl group, an s-butyl group, a t-butyl group, an n-hexyl group, a 2-ethylhexyl group, an n-octyl group, and an n-decyl group.

The aryl group which may substitute a hydrogen atom of the phenylene group is preferably an aryl group having 6 to 20 carbon atoms, and examples thereof include a phenyl group, an o-tolyl group, an m-tolyl group, a p-tolyl group, a 1-naphthyl group, and a 2-naphthyl group.

Examples of the halogen atom which may substitute a hydrogen atom of the phenylene group include a fluorine atom, a chlorine atom, a bromine atom, and an iodine atom.

In a case where a hydrogen atom of the phenylene group is substituted with any of the above groups, the number of hydrogen atoms to be substituted is, for example, 2 or less, and preferably 1 independently for each phenylene group.

The alkylidene group represented by R is preferably an alkylidene group having 1 to 5 carbon atoms, and examples thereof include a methylene group, an ethylidene group, an isopropylidene group, and a 1-butylidene group.

For example, two or more kinds of repeating units (1) to (3) may be each independently included in the aromatic polysulfone resin.

The aromatic polysulfone resin has, for example, the repeating unit (1) in an amount of preferably 50 mol % to 100 mol %, and more preferably 80 mol % to 100 mol % with respect to the total of all the repeating units of the aromatic polysulfone resin. Even more preferably, the aromatic polysulfone resin has substantially only the repeating unit (1) as the repeating unit.

Here, the term "substantially" means that the content of the repeating unit (1) is 99 mol % to 100 mol % with respect to the total of all the repeating units of the aromatic polysulfone resin.

As another aspect, the aromatic polysulfone resin may have, for example, the repeating unit (2) in an amount of 0 mol % to 25 mol % with respect to the total of all the repeating units of the aromatic polysulfone resin.

As another aspect, the aromatic polysulfone resin may have, for example, the repeating unit (3) in an amount of 0 mol % to 25 mol % with respect to the total of all the repeating units of the aromatic polysulfone resin.

A total content of the repeating units (1), (2), and (3) in the aromatic polysulfone resin does not exceed 100 mol %.

The aromatic polysulfone resin according to one embodiment of the present invention is an aromatic polysulfone resin having a repeating unit represented by Formula (I) (hereinafter, may be referred to as "repeating unit (I)") obtained by bonding two of the repeating units (1) via an oxygen atom and a repeating unit represented by Formula (II) (hereinafter, may be referred to as "repeating unit (II)").

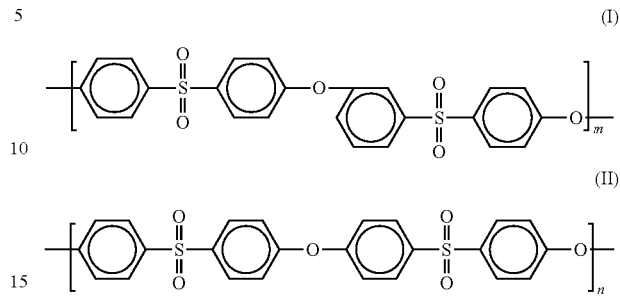

Furthermore, in the aromatic polysulfone resin according to this embodiment, a ratio (m:n) of a molar content (m) of the repeating unit (I) to a molar content (n) of the repeating unit (II) is 1:2,000 to 1:200. In a case where the ratio (m:n) is in a range of 1:2,000 to 1:200, the heat shrinkage rate of a membrane containing the aromatic polysulfone resin is lower than that of an aromatic polysulfone resin which has been known, although the cause thereof is not clear. The method of measuring the heat shrinkage rate will be described later.

The ratio (m:n) of the molar content (m) of the repeating unit (I) to the molar content (n) of the repeating unit (II) is preferably 1:1,500 to 1:250, and more preferably 1:1,000 to 1:300.

In this specification, the ratio (m:n) of the molar content (m) of the repeating unit (I) to the molar content (n) of the repeating unit (II) includes the boundary values.

The hydrogen atoms of the phenylene groups of the repeating units (I) and (II) may be each independently substituted with an alkyl group, an aryl group, or a halogen atom. Examples of the alkyl group, the aryl group, and the halogen atom are the same as the alkyl group, the aryl group, and the halogen atom which may substitute the hydrogen atom of the phenylene group, respectively.

The ratio (m:n) of the molar content (m) of the repeating unit (I) to the molar content (n) of the repeating unit (II) can be obtained from the amount (mol) of the raw material monomers charged and used.

It can be confirmed that all the raw material monomers used are consumed in the polymerization (polycondensation) reaction.

In one aspect, the aromatic polysulfone resin according to this embodiment is an aromatic polysulfone resin in which the repeating unit (1) is included in an amount of preferably 50 mol % to 100 mol %, and more preferably 80 mol % to 100 mol % with respect to the total amount of all the repeating units of the aromatic polysulfone resin, and even more preferably, only the repeating unit (1) is included, the repeating unit (I) and the repeating unit (II) are included as a repeating unit obtained from the repeating unit (1), and a ratio (m:n) of a molar content (m) of the repeating unit (I) to a molar content (n) of the repeating unit (II) is 1:2,000 to 1:200, preferably 1:1,500 to 1:250, and more preferably 1:1,000 to 1:300.

The aromatic polysulfone resin may be an aromatic polysulfone resin in which the repeating unit (2) is included in an amount of 0 mol % to 25 mol % with respect to the total amount of all the repeating units of the aromatic polysulfone resin; the repeating unit (3) may be included in an amount of 0 mol % to 25 mol % with respect to the total amount of all the repeating units of the aromatic polysulfone resin; and a total content of the repeating units (1), (2), and (3) in the aromatic polysulfone resin does not exceed 100 mol %.

The reduced viscosity of the aromatic polysulfone resin is, for example, 0.3 dL/g or greater, preferably 0.4 dL/g to 0.9 dL/g, and more preferably 0.45 dL/g to 0.80 dL/g. The higher the reduced viscosity of the aromatic polysulfone resin is, the more easily the heat resistance and the strength or rigidity are improved. However, in a case where the reduced viscosity is too high, the workability for a case where a porous membrane is manufactured by a method to be described later is not sufficient. That is, in a case where the reduced viscosity of the aromatic polysulfone resin is within the above range, the heat resistance and the strength or rigidity are likely to be improved, and the workability for a case where a porous membrane is manufactured by a method to be described later may be sufficient.

Therefore, the reduced viscosity of the aromatic polysulfone resin according to this embodiment is preferably 0.3 dL/g to 0.9 dL/g, more preferably 0.4 dL/g to 0.9 dL/g, even more preferably 0.45 dL/g to 0.80 dL/g, and particularly preferably 0.45 dL/g to 0.60 dL/g.

The aromatic polysulfone resin can be manufactured by polycondensing a dihalogenosulfone compound and a dihydroxy compound corresponding to the repeating units of the aromatic polysulfone resin.

For example, a resin having the repeating unit (1) can be manufactured by polycondensing a dihalogenosulfone compound represented by Formula (4) (hereinafter, may be referred to as "compound (4)") and a dihydroxy compound represented by Formula (5) (hereinafter, may be referred to as "compound (5)").

A resin having the repeating unit (1) and the repeating unit (2) can be manufactured by polycondensing a compound (4) and a dihydroxy compound represented by Formula (6) (hereinafter, may be referred to as "compound (6)").

A resin having the repeating unit (1) and the repeating unit (3) can be manufactured by polycondensing a compound (4) and a dihydroxy compound represented by Formula (7) (hereinafter, may be referred to as "compound (7)").

$X^1$ and $X^2$ each independently represent a halogen atom. $Ph^1$ and $Ph^2$ are synonymous with those described above.

$Ph^1$ and $Ph^2$ are synonymous with those described above.

$Ph^3$, $Ph^4$, and R are synonymous with those described above.

$Ph^5$ and n' are synonymous with those described above.

In one aspect, the aromatic polysulfone resin according to this embodiment can be manufactured by polycondensing a compound (4) and a compound (5) corresponding to the repeating unit (I) and the repeating unit (II).

In another aspect, in order to manufacture the aromatic polysulfone resin according to this embodiment, a resin having the repeating unit (I) can be heated and mixed with an aromatic polysulfone resin having the repeating units (1) to (3) such that the ratio (m:n) is 1:2,000 to 1:200.

In one aspect, the resin having the repeating unit (I) can be manufactured by polycondensing a compound represented by Formula (III) (hereinafter, may be referred to as "compound (III)") as a compound (4) and a compound represented by Formula (IV) (hereinafter, may be referred to as "compound (IV)") as a compound (5).

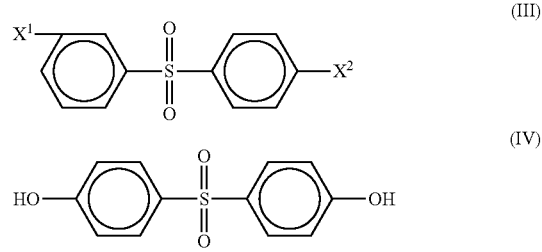

$X^1$ and $X^2$ in Formulae (III) and (IV) are synonymous with those described above. The hydrogen atoms of the phenylene groups in Formulae (III) and (IV) may be each independently substituted with an alkyl group, an aryl group, or a halogen atom. Examples of the alkyl group, the aryl group, and the halogen atom are the same as the alkyl group, the aryl group, and the halogen atom which may substitute the hydrogen atom of the phenylene group, respectively.

In another aspect, the resin having the repeating unit (I) can be manufactured by polycondensing a compound represented by Formula (V) (hereinafter, may be referred to as "compound (V)") as a compound (4) and a dihydroxy compound represented by Formula (VI) (hereinafter, may be referred to as "compound (VI)").

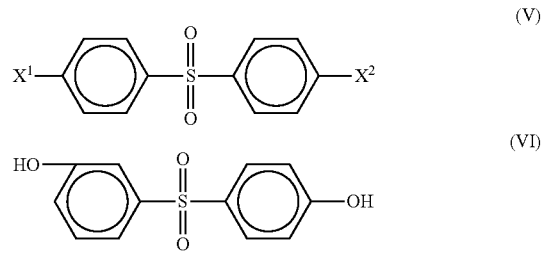

$X^1$ and $X^2$ in Formulae (III) and (IV) are synonymous with those described above. The hydrogen atoms of the phenylene groups in Formulae (III) and (IV) may be each independently substituted with an alkyl group, an aryl group, or a halogen atom. Examples of the alkyl group, the aryl group, and the halogen atom are the same as the alkyl group, the aryl group, and the halogen atom which may substitute the hydrogen atom of the phenylene group, respectively.

The polycondensation is preferably performed in a solvent using an alkali metal salt of carbonic acid. The alkali metal salt of carbonic acid may be an alkali carbonate, an alkali bicarbonate (also referred to as an alkali hydrogen carbonate), or a mixture of the alkali carbonate and the alkali bicarbonate. As the alkali carbonate, a sodium carbonate or a potassium carbonate is preferable, and as the alkali bicarbonate, a sodium bicarbonate or a potassium bicarbonate is preferable. Preferable examples of the solvent include organic polar solvents such as dimethyl sulfoxide, 1-methyl-2-pyrrolidone, sulfolane (also referred to as 1,1-dioxothiolane), 1,3-dimethyl-2-imidazolidinone, 1,3-diethyl-2-imidazolidinone, dimethyl sulfone, diethyl sulfone, diisopropyl sulfone, and diphenyl sulfone.

In the polycondensation, in a case where no side reaction occurs, the closer the molar ratio of the dihalogenosulfone compound to the dihydroxy compound gets to 1:1; the larger the amount of the alkali metal salt of carbonic acid used is; the higher the polycondensation temperature is; and the longer the polycondensation time is, the higher the degree of polymerization of the aromatic polysulfone resin to be obtained is, and the reduced viscosity is likely to increase.

In fact, a by-product alkali hydroxide and the like causes a side reaction such as a substitution reaction of a halogeno group with a hydroxyl group or depolymerization, and due to the side reaction, the degree of polymerization of the aromatic polysulfone resin to be obtained is likely to decrease, and the reduced viscosity is likely to decrease.

Due to the above reasons, the molar ratio of the dihalogenosulfone compound to the dihydroxy compound, the amount of the alkali metal salt of carbonic acid used, the polycondensation temperature, and the polycondensation time are preferably adjusted in consideration of the degree of the side reaction to obtain an aromatic polysulfone resin having a desired reduced viscosity.

[Membrane Containing Aromatic Polysulfone Resin]

A membrane containing the aromatic polysulfone resin according to one embodiment of the present invention may be, for example, a flat membrane, a tubular membrane, or a hollow fiber membrane. The membrane containing the aromatic polysulfone resin according to this embodiment may be a single-layer membrane or a multi-layer membrane. In a case where the membrane containing the aromatic polysulfone resin is a multi-layer membrane, it may be a multi-layer membrane having only two or more layers containing the aromatic polysulfone resin according to one embodiment of the present invention, or a multi-layer membrane having at least one layer containing the aromatic polysulfone resin according to one embodiment of the present invention and at least one different layer.

In one aspect, the membrane according to the present invention is a membrane formed from the aromatic polysulfone resin according to one embodiment of the present invention.

For example, in a case where a hollow fiber membrane containing the resin is used as an artificial dialysis membrane, the hollow fiber membrane may be subjected to a steam sterilization treatment using an autoclave or the like. The steam sterilization treatment is performed under high temperature and high pressure conditions of, for example, a temperature of 121° C. and a pressure of 0.2 MPa. In this case, in a case where the hollow fiber membrane has a high heat shrinkage rate, cracks may occur in the hollow fiber membrane due to the heat shrinkage of the hollow fiber membrane.

In addition, the occurrence of cracks caused by the heat shrinkage of the hollow fiber membrane is a problem that may occur in flat membranes and tubular membranes. In addition, the above-described problem is common to both single-layer membranes and multi-layer membranes.

As described above, in the aromatic polysulfone resin according to this embodiment, the ratio (m:n) of the molar content (m) of the repeating unit (I) to the molar content (n) of the repeating unit (II) is 1:2,000 to 1:200. The heat shrinkage rate of a membrane containing the aromatic polysulfone resin is lower than that of a membrane containing an aromatic polysulfone resin which has been known, although the cause thereof is not clear. Therefore, it is thought that cracks are less likely to occur even in a case where a heat treatment is performed under high temperature and high pressure conditions.

As the heat shrinkage rate of the membrane according to this embodiment, a value measured by the following method after production of a porous membrane containing the aromatic polysulfone resin is employed.

First, a porous membrane (sample) containing an aromatic polysulfone resin stored at 25° C. is cut into a length of 200 mm in a longitudinal direction, and a marked line is drawn at a position 150 mm away from an end portion of the sample in a longitudinal direction. Next, the sample is left in an autoclave and heat-treated for 30 minutes at a temperature of 121° C. without tension, and then the heated sample is transferred to a desiccator and cooled until the sample temperature reaches 25° C. The distance from the end portion of the cooled sample to the marked line is measured, and the heat shrinkage rate is calculated by Formula (S1). The test was performed 3 times by changing the sample for each test, and an average of the test results is used.

Heat Shrinkage Rate (%)=[1−Distance (mm) from End Portion After Heating Treatment to Marked Line/Distance (mm) from End Portion Before Heating Treatment to Marked Line]×100    (S1)

In one aspect, in the membrane containing the aromatic polysulfone resin according to this embodiment, in a case where the heat shrinkage rate is measured by the above-described measurement method, the heat shrinkage rate is preferably 0% to 3%, more preferably 1% to 2%, and even more preferably 1.3% to 1.7%.

[Method of Manufacturing Membrane Containing Aromatic Polysulfone Resin]

A known method can be appropriately employed to manufacture a membrane according to this embodiment. In the manufacturing of a porous membrane as the membrane according to this embodiment, in order to manufacture the porous membrane, for example, a solution obtained by dissolving the aromatic polysulfone resin in a solvent may be extruded into a predetermined shape and introduced to a coagulating liquid in a dry-and-wet manner through an air gap or in a wet manner without the air gap to perform phase separation and desolvation. Separately from this method, in order to manufacture the porous membrane, a solution obtained by dissolving the aromatic polysulfone resin in a solvent may be cast on a base material having a predetermined shape and immersed in a coagulating liquid to perform phase separation and desolvation.

In the manufacturing of a non-porous membrane as the membrane according to this embodiment, in order to manufacture the non-porous membrane, for example, the aromatic polysulfone resin may be melted and extruded into a predetermined shape. Separately from this method, in order to manufacture the non-porous membrane, the aromatic polysulfone resin may be melted and cast on a base material having a predetermined shape. Separately from this method, in order to manufacture the non-porous membrane, the aromatic polysulfone resin may be dissolved in a solvent, and this solution may be cast on a base material having a predetermined shape to perform desolvation.

In a case where a hollow fiber membrane is manufactured as the porous membrane according to this embodiment, the solution is prepared as a spinning dope, and double annular nozzles are used. Specifically, in order to manufacture a porous hollow fiber membrane, the solution is discharged from an external annular nozzle of the double annular nozzles, and the coagulating liquid (hereinafter, may be referred to as "internal coagulating liquid") or gas is discharged from an internal nozzle. The material discharged from the double annular nozzles is preferably introduced into the coagulating liquid (hereinafter, may be referred to as "external coagulating liquid") via or without the air gap.

Examples of the good solvent for the aromatic polysulfone resin (hereinafter, may be simply referred to as "good solvent") used for preparing the solution include N-methyl-2-pyrrolidone, N,N-dimethylformamide, and N,N-dimethylacetamide.

Particularly, in the manufacturing of a porous membrane, the solution may contain an aromatic polyester resin, a component other than the good solvent, and a swelling agent. Examples of the component other than the good solvent include a hydrophilic polymer and a poor solvent for the aromatic polysulfone resin (hereinafter, may be simply referred to as "poor solvent"). In a case where a hydrophilic polymer is contained in the solution, it is possible to obtain a porous membrane which has good water permeability and is suitably used for filtration such as ultrafiltration or precision filtration of an aqueous fluid. In a case where the solution does not contain a poor solvent or a swelling agent, N,N-dimethylacetamide is preferably used as the good solvent.

Examples of the hydrophilic polymer include polyvinylpyrrolidones, polyalkylene glycols such as a polyethylene glycol and a polypropylene glycol, polyvinyl alcohols, polyhydroxyalkyl (meth)acrylates such as a polyhydroxyethyl acrylate and a polyhydroxyethyl methacrylate, polyacrylamides, and polyethyleneimines. Two or more kinds of the above examples may be optionally used as the hydrophilic polymer. Among these, polyvinylpyrrolidones, particularly, high-molecular-weight polyvinylpyrrolidones having a weight average molecular weight of 100,000 or more are preferably used since even in a case where the content thereof is small, the thickening effect of the solution can be enhanced.

The amount of the hydrophilic polymer used is, for example, 5 to 40 parts by weight, and preferably 15 to 30 parts by weight with respect to 100 parts by weight of the aromatic polysulfone resin. In a case where the amount of the hydrophilic polymer used is too small, a porous membrane to be obtained does not have sufficient water permeability. In addition, in a case where the amount is too large, a porous membrane to be obtained does not have sufficient heat resistance, chemical resistance, and toughness.

Examples of the swelling agent include ethylene glycols such as an ethylene glycol, a diethylene glycol, and a triethylene glycol, and an ethylene glycol is preferable since it is easily removed.

As the coagulation liquid, the poor solvent or a mixed solvent of the poor solvent and the good solvent can be used. As the coagulating liquid, a mixed solvent of the poor solvent and the good solvent is preferably used. By adjusting the mixing ratio of the poor solvent to the good solvent, a pore size or a pore size distribution of the porous membrane to be obtained can be adjusted.

In the manufacturing of a porous membrane with the addition of a hydrophilic polymer to the solution, the porous membrane to be obtained may be optionally subjected to a heat treatment or a radiation treatment. Accordingly, the hydrophilic polymer in the porous membrane is insolubilized. By performing the heat treatment or the radiation treatment, the hydrophilic polymer is crosslinked and fixed in the porous membrane. Accordingly, in a case where the porous membrane is used as a filtration membrane, it is possible to suppress the elution of the hydrophilic polymer into the filtrate.

The heat treatment or the radiation treatment is preferably performed under such conditions that the porous membrane has no significant changes in shape, structure, mechanical characteristics, and the like and the hydrophilic polymer is sufficiently crosslinked. Any one or both of the treatments may be performed.

For example, the heat treatment for the porous membrane manufactured by using a polyvinylpyrrolidone as the hydrophilic polymer is preferably performed at a treatment temperature of 150° C. to 190° C., and the treatment time is appropriately set according to the amount of the polyvinylpyrrolidone in the porous membrane.

The radiation treatment for the porous membrane can be performed using α-rays, β-rays, γ-rays, X-rays, or electron rays as radiation. In this case, in a case where the radiation treatment is performed in a state in which the porous membrane is impregnated with antioxidant-containing water, damage to the porous membrane can be effectively suppressed.

As described above, in a case where a hollow fiber membrane is manufactured as the porous membrane, the hollow fiber membrane may be subjected to a steam sterilization treatment using an autoclave or the like.

The porous membrane to be obtained may be subjected to a treatment other than a heat treatment, a radiation treatment, or a steam sterilization treatment as the sterilization treatment. In a case where such a treatment for heating the porous membrane is performed and the porous membrane has a high heat shrinkage rate, cracks may occur in the porous membrane due to the heat shrinkage of the porous membrane.

The problem that cracks occur in the porous membrane due to the heat shrinkage of the porous membrane is a problem common not only to porous membranes but also to flat membranes or tubular membranes. In addition, the above-described problem is common to both single-layer membranes and multi-layer membranes.

Even in a case where the membrane is not treated as described above, it is thought that the same problem occurs also in a case where the membrane is heated during the manufacturing or use of the membrane.

Regarding such a problem, the membrane containing the aromatic polysulfone resin according to this embodiment has a low heat shrinkage rate. Accordingly, it is possible to suppress the occurrence of cracks in the membrane due to the heat shrinkage of the membrane.

According to this embodiment, an aromatic polysulfone resin which is used to obtain a membrane having a low heat shrinkage rate and a membrane thereof are obtained.

In one aspect, the membrane according to one embodiment of the present invention preferably contains the aromatic polysulfone resin in an amount of 95 to 100 mass % with respect to the total mass of the membrane.

In another aspect, the membrane according to one embodiment of the present invention may contain the aromatic polysulfone resin according to one embodiment of the present invention and an optional hydrophilic polymer.

The content of the hydrophilic polymer is preferably 1 to 5 mass % with respect to the total mass of the membrane.

In one aspect, the aromatic polysulfone resin according to one embodiment of the present invention is an aromatic polysulfone resin which is obtained by polycondensing 4,4'-dihydroxydiphenyl sulfone (content of 3,4'-dihydroxydiphenyl sulfone: 0 mass %) and a dichlorodiphenyl sulfone mixture (containing 4,4'-dichlorodiphenyl sulfone and 3,4'-dichlorodiphenyl sulfone, the content of 3,4'-dichlorodiphenyl sulfone with respect to the total mass of the dichlorodiphenyl sulfone mixture is greater than 0 mass % and 0.3 mass % or less), and in which a ratio (m:n) of a molar content (m) of the repeating unit (I) to a molar content (n)

of the repeating unit (II) is 1:2,000 to 1:200, preferably 1:1,500 to 1:250, and more preferably 1:1,000 to 1:300.

In one aspect, the membrane according to one embodiment of the present invention is a membrane containing the aromatic polysulfone resin, in which in a case where a heat shrinkage rate of the membrane is measured by the above-described method of measuring the heat shrinkage rate, the heat shrinkage rate is preferably 0% to 3%, more preferably 1% to 2%, and even more preferably 1.3% to 1.7%.

In yet another aspect, in the aromatic polysulfone resin, a reduced viscosity may be 0.3 dL/g to 0.9 dL/g, preferably 0.4 dL/g to 0.9 dL/g, more preferably 0.45 dL/g to 0.80 dL/g, and even more preferably 0.45 dL/g to 0.60 dL/g when being measured by the method described in [Measurement of Reduced Viscosity] to be described later; and a tensile strength may be 85 to 88 MPa when being measured by the method described in [Measurement of Tensile Strength] to be described later.

EXAMPLES

Examples of the present invention will be shown below, but the present invention is not limited thereto.

In the examples, a porous membrane was used as an example of a membrane containing an aromatic polysulfone resin.

[Measurement of Reduced Viscosity]

1 g of an aromatic polysulfone resin obtained in Manufacturing Examples 1 to 5 was dissolved in N,N-dimethylformamide such that a volume of the resulting solution was 1 dL, and a viscosity ($\eta$) of the solution was measured at 25° C. using an Ostwald viscosity tube. In addition, a viscosity ($\eta_0$) of N,N-dimethylformamide as a solvent was measured at 25° C. using an Ostwald viscosity tube. Since the concentration of the solution is 1 g/dL, the value of the specific viscosity ($(\eta-\eta_0)/\eta_0$) is the value of the reduced viscosity in units of dL/g.

[Measurement of Tensile Strength]

40 g of the resin obtained in Manufacturing Examples 1 to 5 and 160 g of N-methyl-2-pyrrolidone were stirred for 2 hours at 60° C. to obtain an aromatic polysulfone resin solution. Next, the solution was cast on a glass plate (thickness: 3 mm) using a film applicator such that a membrane thickness after a heat treatment was 30 μm. The obtained resin layer was heated at 80° C. by a high temperature hot air dryer to remove the solvent such that the residual solvent amount in the resin layer was 10 mass % or less. Then, a heat treatment was performed at 250° C. under a nitrogen atmosphere, and thus an aromatic polysulfone resin film was obtained.

Using the obtained film, a tensile strength was measured based on ASTM D882 by Autograph manufactured by Shimadzu Corporation. The test was performed 5 times, and an average of the test results was used.

[Measurement of Heat Shrinkage Rate]

First, a porous membrane (sample) stored at 25° C. was cut into a length of 200 mm in a longitudinal direction, and a marked line was drawn at a position 150 mm away from an end portion of the sample in a longitudinal direction. Next, the sample was left in an autoclave and heat-treated for 30 minutes at a temperature of 121° C. without tension, and then the heated sample was transferred to a desiccator and cooled until the sample temperature reached 25° C. The distance from the end portion of the cooled sample to the marked line was measured, and a heat shrinkage rate was calculated by Formula (S1). The test was performed 3 times by changing the sample for each test, and an average of the test results was used.

Heat Shrinkage Rate (%)=[1−Distance (mm) from End Portion After Heating Treatment to Marked Line/Distance (mm) from End Portion Before Heating Treatment to Marked Line]×100  (S1)

<Manufacturing of Aromatic Polysulfone Resin>

In the following manufacturing examples, a dichlorodiphenyl sulfone mixture obtained by mixing 4,4'-dichlorodiphenyl sulfone and 3,4'-dichlorodiphenyl sulfone was used as a dihalogenosulfone compound.

As a dihydroxysulfone compound, a dihydroxydiphenyl sulfone mixture obtained by mixing 4,4'-dihydroxydiphenyl sulfone and 3,4'-dihydroxydiphenyl sulfone was used.

A ratio (m:n) of a molar content (m) of a repeating unit (I) to a molar content (n) of a repeating unit (II) in the aromatic polysulfone resin was obtained from the amount (mol) of the raw material monomers charged. It was confirmed that all the raw material monomers used were consumed in the polymerization (polycondensation) reaction.

The content of 3,4'-dichlorodiphenyl sulfone with respect to the total mass of the dichlorodiphenyl sulfone mixture was obtained by gas chromatography (may be abbreviated as GC) analysis under the following conditions. In addition, the content of 3,4'-dihydroxydiphenyl sulfone with respect to the total mass of the dihydroxydiphenyl sulfone mixture was obtained by GC analysis under the following conditions.

(Conditions)

Sample: Injection of 1 μL of a solution obtained by dissolving 0.1 g of the sample in 5 ml of acetone.

Device: Gas chromatograph 6850 manufactured by Agilent Technologies, Inc.

Column: GC column DB-5 manufactured by Agilent Technologies, Inc. (inner diameter: 0.25 mm, length: 30 m, membrane thickness: 1 μm)

Column Temperature: 290° C.

Detector: Hydrogen flame ionization type

[Measurement of Content of 3,4'-Dichlorodiphenyl Sulfone]

In an obtained spectrum, the total peak area detected after a holding time of 15 minutes was set to 100, and the peak area detected at the holding times of 15.4 minutes to 15.7 minutes was obtained by an area percentage method to calculate the content of 3,4'-dichlorodiphenyl sulfone with respect to the total mass of the dichlorodiphenyl sulfone mixture.

[Measurement of Content of 3,4'-Dihydroxydiphenyl Sulfone]

In the obtained spectrum, the sum of peak areas detected after a holding time of 14 minutes was set to 100, and the peak area detected at the holding times of 14.5 minutes to 14.8 minutes was obtained by an area percentage method to calculate the content of 3,4'-dihydroxydiphenyl sulfone with respect to the total mass of the dihydroxydiphenyl sulfone mixture.

Manufacturing Example 1

A polymerization tank with a capacity of 500 mL provided with a stirrer, a nitrogen introduction pipe, a thermometer, and a condenser having a receiver at a tip thereof was charged with 100.1 g of 4,4'-dihydroxydiphenyl sulfone (content of 3,4'-dihydroxydiphenyl sulfone: 0 mass %), 117.7 g of 4,4'-dichlorodiphenyl sulfone (content of 3,4'-dichlorodiphenyl sulfone: 0.1 mass %), and 193.6 g of diphenyl sulfone as a polymerization solvent, and the temperature was raised to 180° C. during circulation of a nitrogen gas in the system. 56.5 g of potassium carbonate was added to the obtained solution. Then, the temperature was gradually raised to 290° C., and the reaction was carried out at 290° C. for 4 hours.

Next, the obtained reaction liquid was cooled to room temperature (25° C.) to solidify the reaction product. The solid material was taken out and finely pulverized, and then the pulverized solid material was subjected to washing with warm water and washing with a mixed solvent of acetone and methanol several times. The washed solid material was heated and dried at 150° C. to obtain a white powder of an aromatic polysulfone resin.

The reduced viscosity of the aromatic polysulfone resin was 0.60 (dL/g). The ratio (m:n) in the aromatic polysulfone resin was 1:1,000.

Manufacturing Example 2

An aromatic polysulfone resin was obtained in the same manner as in Manufacturing Example 1, except that the content of 3,4'-dichlorodiphenyl sulfone with respect to the total amount of the dichlorodiphenyl sulfone mixture was changed to 0.3 mass %.

The reduced viscosity of the aromatic polysulfone resin was 0.60 (dL/g). The ratio (m:n) in the aromatic polysulfone resin was 1:333.

Manufacturing Example 3

An aromatic polysulfone resin was obtained in the same manner as in Manufacturing Example 1, except that the content of 3,4'-dichlorodiphenyl sulfone with respect to the total amount of the dichlorodiphenyl sulfone mixture was changed to 0 mass %.

The reduced viscosity of the aromatic polysulfone resin was 0.60 (dL/g). The ratio (m:n) in the aromatic polysulfone resin was 0:100.

Manufacturing Example 4

An aromatic polysulfone resin was obtained in the same manner as in Manufacturing Example 1, except that the content of 3,4'-dichlorodiphenyl sulfone with respect to the total amount of the dichlorodiphenyl sulfone mixture was changed to 0.7 mass %.

The reduced viscosity of the aromatic polysulfone resin was 0.60 (dL/g). The ratio (m:n) in the aromatic polysulfone resin was 1:143.

Manufacturing Example 5

An aromatic polysulfone resin was obtained in the same manner as in Manufacturing Example 1, except that the content of 3,4'-dichlorodiphenyl sulfone with respect to the total amount of the dichlorodiphenyl sulfone mixture was changed to 1.0 mass %.

The reduced viscosity of the aromatic polysulfone resin was 0.60 (dL/g). The ratio (m:n) in the aromatic polysulfone resin was 1:100.

<Manufacturing of Porous Membrane Containing Aromatic Polysulfone Resin>

Example 1

40 g of the aromatic polysulfone resin obtained in Manufacturing Example 1, 120 g of polyethylene glycol 400, and 140 g of N-methyl-2-pyrrolidone were put into a 500 mL separable flask, and stirred for 2 hours at 60° C. to obtain a slightly yellow aromatic polysulfone resin solution. The solution was applied to a glass plate having a thickness of 3 mm using a film applicator such that a resin layer thickness before drying was 300 μm, and immediately after the application, the glass plate was immersed in water. Then, the coating peeled from the glass plate was left in water for 30 minutes. Next, the coating was dried all night at 50° C. using a high temperature hot air dryer, and a porous membrane containing an aromatic polysulfone resin was obtained.

Example 2

A porous membrane containing an aromatic polysulfone resin was obtained in the same manner as in Example 1, except that the aromatic polysulfone resin obtained in Manufacturing Example 2 was used.

Comparative Example 1

A porous membrane containing an aromatic polysulfone resin was obtained in the same manner as in Example 1, except that the aromatic polysulfone resin obtained in Manufacturing Example 3 was used.

Comparative Example 2

A porous membrane containing an aromatic polysulfone resin was obtained in the same manner as in Example 1, except that the aromatic polysulfone resin obtained in Manufacturing Example 4 was used.

Comparative Example 3

A porous membrane containing an aromatic polysulfone resin was obtained in the same manner as in Example 1, except that the aromatic polysulfone resin obtained in Manufacturing Example 5 was used.

Table 1 shows the reduced viscosities, ratios (m:n) and tensile strengths of the aromatic polysulfone resins of Examples 1 and 2 and Comparative Examples 1 to 3, and the heat shrinkage rates of the porous membranes.

TABLE 1

|  |  | Example 1 | Example 2 | Comparative Example 3 | Comparative Example 1 | Comparative Example 2 |
|---|---|---|---|---|---|---|
| Aromatic Polysulfone Resin | Reduced Viscosity (dL/g) | 0.60 | 0.60 | 0.60 | 0.60 | 0.60 |
|  | m:n | 1:1,000 | 1:333 | 0:100 | 1:143 | 1:100 |
| Evaluation Results | Tensile Strength (MPa) | 85 | 86 | 87 | 88 | 85 |
|  | Heat Shrinkage Rate (%) | 1.3 | 1.7 | 3.3 | 5.0 | 5.3 |

INDUSTRIAL APPLICABILITY

According to the present invention, it is possible to provide an aromatic polysulfone resin which is used to obtain a membrane having a low heat shrinkage rate and a membrane thereof, and thus the present invention is industrially extremely useful.

The invention claimed is:

1. An aromatic polysulfone resin comprising:
a repeating unit represented by Formula (I); and
a repeating unit represented by Formula (II),
wherein a ratio (m:n) of a molar content (m) of the repeating unit represented by Formula (I) to a molar content (n) of the repeating unit represented by Formula (II) is 1:1000 to 1:300

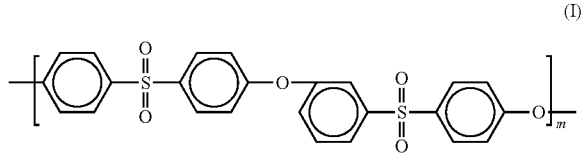
(I)

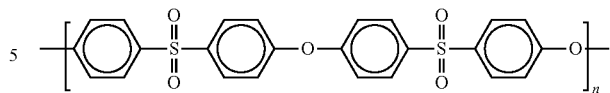
(II)

wherein hydrogen atoms of phenylene groups of Formulae (I) and (II) may be each independently substituted with an alkyl group, an aryl group, or a halogen atom.

2. A membrane comprising:
the aromatic polysulfone resin according to claim 1.

3. The membrane according to claim 2, which is a porous membrane.

4. The aromatic polysulfone resin according to claim 1, wherein a reduced viscosity of the aromatic polysulfone resin is 0.3 dL/g to 0.9 dL/g.

5. The aromatic polysulfone resin according to claim 1, wherein a reduced viscosity of the aromatic polysulfone resin is 0.45 dL/g to 0.80 dL/g.

* * * * *